US012069467B2

(12) United States Patent
Mariglio, III

(10) Patent No.: US 12,069,467 B2
(45) **Date of Patent: *Aug. 20, 2024**

(54) ALL-PASS NETWORK SYSTEM FOR COLORLESS DECORRELATION WITH CONSTRAINTS

(71) Applicant: Boomcloud 360 Inc., Encinitas, CA (US)

(72) Inventor: Joseph Anthony Mariglio, III, Encinitas, CA (US)

(73) Assignee: Boomcloud 360 Inc., Encinitas, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/890,207

(22) Filed: Aug. 17, 2022

(65) Prior Publication Data

US 2022/0394408 A1 Dec. 8, 2022

Related U.S. Application Data

(63) Continuation of application No. 17/180,643, filed on Feb. 19, 2021, now Pat. No. 11,451,919.

(51) Int. Cl.
*H04R 5/00* (2006.01)
*H04S 5/02* (2006.01)

(52) U.S. Cl.
CPC .................................... *H04S 5/02* (2013.01)

(58) Field of Classification Search
CPC ........................................................ H04S 5/02
USPC ..................................................... 381/17, 18
See application file for complete search history.

(56) References Cited

U.S. PATENT DOCUMENTS

| | | | | |
|---|---|---|---|---|
| 5,208,860 | A | 5/1993 | Lowe et al. | |
| 2005/0177360 | A1 | 8/2005 | Schuijers et al. | |
| 2007/0168183 | A1 | 7/2007 | Van De Kerkhof | |
| 2011/0115987 | A1* | 5/2011 | Kubo | H04R 5/04 348/E5.122 |
| 2016/0005417 | A1* | 1/2016 | Van Hoesel | G10L 21/0208 381/317 |

(Continued)

FOREIGN PATENT DOCUMENTS

KR 10-2007-0091518 A 9/2007

OTHER PUBLICATIONS

PCT International Search Report and Written Opinion, PCT Application No. PCT/US2022/016836, Jun. 2, 2022, nine pages.

(Continued)

*Primary Examiner* — Ammar T Hamid
(74) *Attorney, Agent, or Firm* — Fenwick & West LLP

(57) ABSTRACT

A system includes one or more computing devices that decorrelates a monaural channel into a plurality of output channels. A computing device determines a target amplitude response defining one or more constraints on a summation of the plurality of channels. The target amplitude response is defined by relationships between amplitude values of the summation and frequency values of the summation. The computing device determines a transfer function of a single-input, multi-output all pass filter based on the target amplitude response and determines coefficients of the allpass filter based on the transfer function. The computing devices processes the monaural channel with the coefficients of the allpass filter to generate the plurality of channels.

51 Claims, 9 Drawing Sheets

(56) References Cited

U.S. PATENT DOCUMENTS

| | | | | |
|---|---|---|---|---|
| 2016/0203822 | A1 | 7/2016 | Purnhagen et al. | |
| 2022/0007117 | A1* | 1/2022 | Edwards | H04S 1/005 |

OTHER PUBLICATIONS

Pei, S-C. et al. "Closed-Form Design of All-Pass Fractional Delay Filters." IEEE Signal Processing Letters, vol. 11, No. 10, Oct. 2004, pp. 788-791.

Taiwan Intellectual Property Office, Office Action, Taiwanese Patent Application No. 111105983, Feb. 18, 2023, 12 pages.

* cited by examiner

300

ALL-PASS NETWORK SYSTEM FOR COLORLESS DECORRELATION WITH CONSTRAINTS

CROSS REFERENCE TO RELATED APPLICATIONS

This application is a continuation of U.S. patent application Ser. No. 17/180,643 filed on Feb. 19, 2021, all of this application is incorporated by reference in its entirety for all purposes.

TECHNICAL FIELD

This disclosure relates generally to audio processing, and more specifically to decorrelation of audio content.

BACKGROUND

A channel of audio data may be upmixed into multiple channels. For example, a content provider may desire to upmix from monaural to stereo, but there exists the possibility that the endpoint device is incapable of providing two independent channels, and instead sums the stereo channels together. When there is summation occurring at the endpoint, decorrelation techniques such as phase-inversion or reverberator-based effects may fail. One possible failure state using phase-inversion may result in infinite attenuation at the output. As such, it is desirable to constrain the worst-case outcome of upmixing such that the summation of the upmixed channels exceeds minimum quality requirements.

SUMMARY

Some embodiments include a method for generating a plurality of channels from a monaural channel. The method includes, by a processing circuitry, determining a target amplitude response defining one or more constraints on a summation of the plurality of channels, the target amplitude response being defined by relationships between amplitude values of the summation and frequency values of the summation. The method further includes determining a transfer function of a single-input, multi-output allpass filter based on the target amplitude response and determining coefficients of the allpass filter based on the transfer function. The method further includes processing the monaural channel with the coefficients of the allpass filter to generate the plurality of channels.

Some embodiments include a system for generating a plurality of channels from a monaural channel. The system includes one or more computing devices configured to determine a target amplitude response defining one or more constraints on a summation of the plurality of channels. The target amplitude response being defined by relationships between amplitude values of the summation and frequency values of the summation. The one or more computers determine a transfer function of a single-input, multi-output allpass filter based on the target amplitude response. The one or more computers determine coefficients of the allpass filter based on the transfer function, and process the monaural channel with the coefficients of the allpass filter to generate the plurality of channels.

Some embodiments include a non-transitory computer readable medium including stored instructions for generating a plurality of channels from a monaural channel, the instructions that, when executed by at least one processor, configure the at least one processor to: determine a target amplitude response defining one or more constraints on a summation of the plurality of channels, the target amplitude response being defined by relationships between amplitude values of the summation and frequency values of the summation; determine a transfer function of a single-input, multi-output allpass filter based on the target amplitude response; determine coefficients of the allpass filter based on the transfer function; and process the monaural channel with the coefficients of the allpass filter to generate the plurality of channels.

Figure 1:
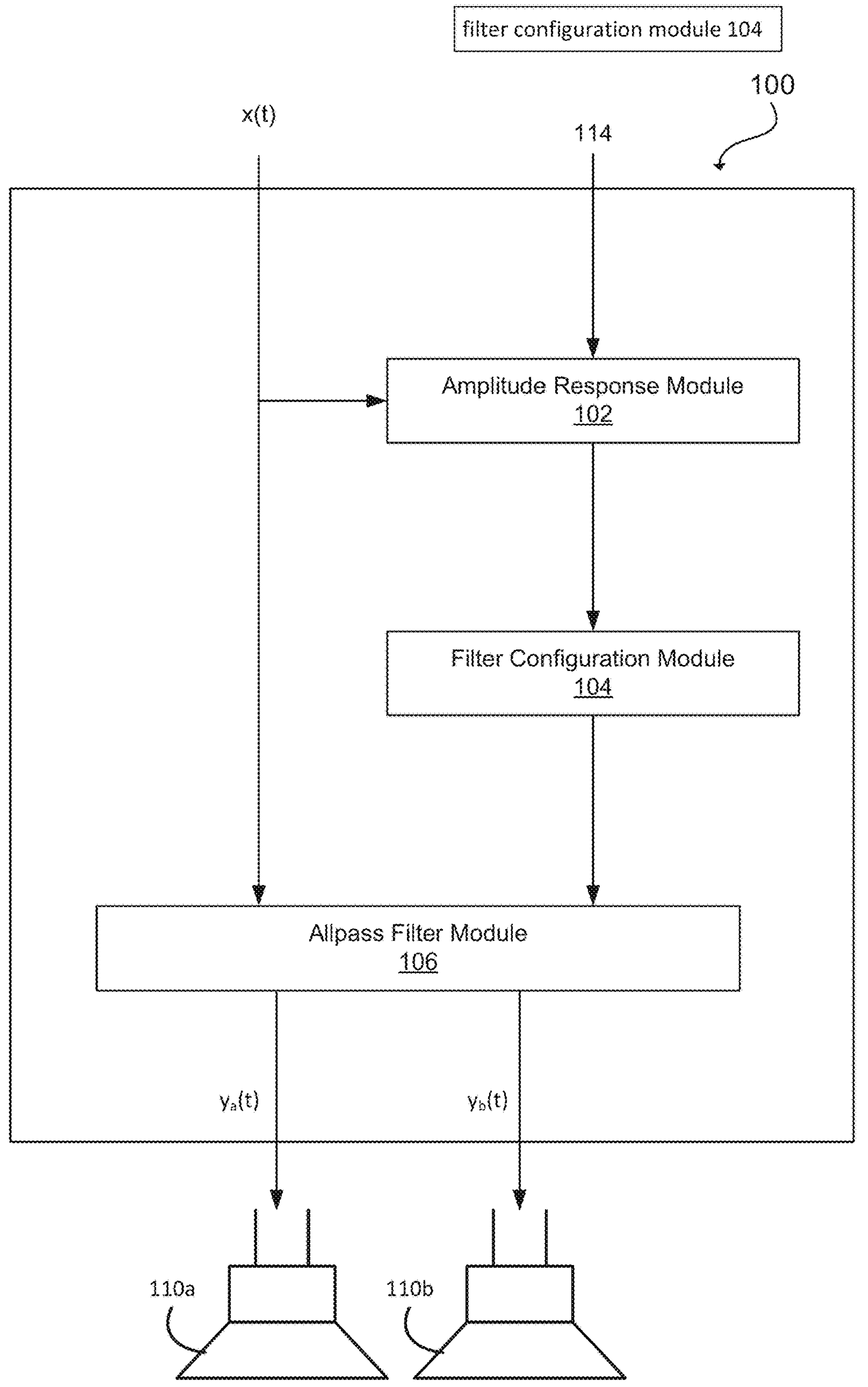
FIG. 1 is a block diagram of an audio system, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to an audio system that provides for mono presentation compatibility for a decorrelation of a monaural channel into multiple channels. The audio system achieves the mono presentation compatibility using a colorless decorrelation of audio, subject to constraints. The audio system constrains the worst-case outcome of upmixing to allow the summation of the upmixed channels to satisfy or exceed minimum quality requirements. These quality requirements or constraints may be specified by a target amplitude response as a function of frequency. Decorrelation refers to altering a channel of audio data such that, when presented on two or more speakers, the psychoacoustic extent (or "width") of the audio data may be increased. Colorless refers to the preservation of the input audio data spectral magnitudes at each of the output channels. The audio system uses decorrelation for upmixing, where the audio system configures an allpass filter according to the target amplitude response and applies the allpass filter to a monaural channel to generate multiple output channels. The filters used for the decorrelation are colorless and perceptually increase the extent of the soundstage of monaural audio. These filters allow the user to specify constraints on attenuation and coloration that might arise due to the unexpected summation of two or more decorrelated versions of a mono signal.

Advantages of the colorless decorrelation subject to constraints include the ability to adjust for the type and degree of perceptual transformation of the summed outputs. The adjustments, as may be defined by the target amplitude response, may be informed by considerations such as the characteristics of the presentation device, the expected content of the audio data, the perceptual capacity of the listener in context, or the minimum quality of requirements for monaural presentation compatibility.

Audio System

FIG. 1 is a block diagram of an audio system 100, in accordance with some embodiments. The audio system 100 provides for decorrelating a mono channel into multiple channels. The system 100 includes an amplitude response module 102, an allpass filter configuration module 104, and an allpass filter module 106. The system 100 processes an monaural input channel x(t) to generate multiple output channels, such as a channel $y_a(t)$ that is provided to a speaker 110*a* and a channel $y_b(t)$ that is provided to a speaker 110*b*. Although two output channels are shown, the system 100 may generate any number of output channels (each referred to as a channel y(t)). The system 100 may be a computing device, such as a music player, speaker, smart speaker, smart phone, wearable device, tablet, laptop, desktop, or the like.

The amplitude response module 102 determines a target amplitude response defining one or more constraints on the summation of the output channels y(t). The target amplitude response is defined by relationships between amplitude values of the summation of channels and frequency values of the summation of channels, such as amplitude as a function of frequency. The one or more constraints on the summation of the channels may include a target broadband attenuation, a target subband attenuation, a critical point, or a filter characteristic. The amplitude response module 102 may receive data 114 and the monaural channel x(t) and use these inputs to determine the target amplitude response. The data 114 may include information such as the characteristics of a presentation device (e.g., one or more speakers), expected content of the audio data, perceptual capacity of the listener in context, or minimum quality of requirements for monaural presentation compatibility.

Target broadband attenuation is a constraint on a maximum amount of attenuation of the amplitude of the summation for all of the frequencies. Target subband attenuation is a constraint on a maximum amount of attenuation of the amplitude of the summation for a range of frequencies defined by the subband. The target amplitude response may include one or more target subband attenuation values each for a different subband of the summation.

A critical point is a constraint on the curvature of the target amplitude response of a filter, described as a frequency value at which the gain for the summation is at a predefined value, such as −3 dB or −∞ dB. The placement of this point may have a global effect on the curvature of the target amplitude response. One example of a critical point corresponds with the frequency at which the target amplitude response is −∞ dB. Because the behavior of the target amplitude response is to nullify the signal at frequencies near this point, this critical point is a null point. Another example of a critical point corresponds with the frequency at which the target amplitude response is −3 dB. Because the behavior of the target amplitude response for the summation and difference channels intersect at this point, this critical point is a crossover point.

The filter characteristic is a constraint on how the summation is filtered. Examples of filter characteristics include a high-pass filter characteristic, a low-pass characteristic, a band-pass characteristic, or a band-reject characteristic. The filter characteristic describes the shape of the resulting sum as if it were the result of an equalization filtering. The equalization filtering may be described in terms of what frequencies may pass through the filter, or what frequencies are rejected. Thus, a low-pass characteristic allows the frequencies below an inflection point to pass through and attenuates the frequencies above the inflection point. A high-pass characteristic does the opposite by allowing frequencies above an inflection point to pass through and attenuating the frequencies below the inflection point. A band-pass characteristic allows the frequencies in a band around an inflection point to pass through, attenuating other frequencies. A band-reject characteristic rejects frequencies in a band around an inflection point, allowing other frequencies to pass through.

The target amplitude response may define more than a single constraint on the summation. For example, the target amplitude response may define constraints on the critical point and a filter characteristic of the summed outputs of the allpass filter. In another example, the target amplitude response may define constraints on the target broadband attenuation, the critical point, and the filter characteristic. Although discussed as being as independent constraints, the constraints may be interdependent on one another for most regions of the parameter space. This result may be caused by the system being nonlinear with respect to phase. To address this, additional, higher-level descriptors of the target amplitude response may be devised which are nonlinear functions of the target amplitude response parameters.

The filter configuration module 104 determines properties of a single-input, multi-output allpass filter based on the target amplitude response received from the amplitude response module 102. In particular, the filter configuration module determines a transfer function of the allpass filter based on the target amplitude response and determines coefficients of the allpass filter based on the transfer function. The allpass filter is a decorrelating filter that is constrained by the target amplitude response and is applied to the monaural input channel x(t) to generate the output channels $y_a(t)$ and $y_b(t)$.

The allpass filter may include different configurations and parameters based on the constraints defined by the target amplitude response. A decorrelating filter which constrains the target broadband attenuation of the channel summation has the benefit of conserving the spectral content (e.g., entirely). Such a filter may be useful when no assumptions regarding the prioritization of particular spectral bands can be made, either about the input channel or the audio presentation device. The transfer function of the allpass filter, for each output channel, is defined as a constant function at a level specified by a value θ.

To configure or create the filter, the filter configuration module 104 determines a pair of quadrature allpass filters, using a continuous-time prototype according to Equation 1:

$$\mathcal{H}(x(t)) \equiv [\mathcal{H}(x(t))_1 \;\; \mathcal{H}(x(t))_2] \equiv [\tilde{x}(t) \;\; \frac{1}{\pi}\int_{-\infty}^{\infty}\frac{\tilde{x}(\tau)}{t-r}dt] \quad \text{Eq. (1)}$$

The allpass filter provides constraints on the 90° phase relationship between the two output signals and the unity magnitude relationship between the input and both output signals, but does not guarantee a phase relationship between the input (mono) signal and either of the two (stereo) output signals.

The discrete form of $\mathcal{H}$(x(t)) is notated $H_2$(x(t)) and is defined by its action on the monaural signal x(t). The result is a 2-dimensional vector as defined by Equation 2:

$$H_2(x(t)) \equiv [\mathcal{H}(x(t))_1 \; \mathcal{H}(x(t))_2] \quad \text{Eq. (2)}$$

The filter configuration module 104 determines a 2×2 orthogonal rotation matrix according to Equation 3:

$$R_2(\theta) \equiv \begin{bmatrix} \cos\theta & -\sin\theta \\ \sin\theta & \cos\theta \end{bmatrix} \quad \text{Eq. (3)}$$

where θ determines the angle of rotation.

The filter configuration module 104 determines a projection into one dimension as defined by Equation 4:

$$P \equiv \begin{bmatrix} 1 \\ 0 \end{bmatrix} \quad \text{Eq. (4)}$$

and their product is concatenated on the right with a second 2×1 dimensional projection as defined by Equation 5:

$$O_2(\theta) \equiv [\,(R_2(\theta)P) \;\; P\,] \equiv \begin{bmatrix} \cos\theta & 1 \\ \sin\theta & 0 \end{bmatrix} \quad \text{Eq. (5)}$$

The filter configured by the filter configuration module 104 may thus be defined by Equation 6:

$$\begin{aligned} A_b(x(t), \theta) &\equiv H_2(x(t))O_2(\theta) \\ &\equiv \left[\mathcal{H}(x(t))_1 \;\; \mathcal{H}(x(t))_2\right]\begin{bmatrix} \cos\theta & 1 \\ \sin\theta & 0 \end{bmatrix} \\ &\equiv [(\mathcal{H}(x(t))_1\cos\theta + \mathcal{H}(x(t))_2\sin\theta) \;\; \mathcal{H}(x(t))_1] \end{aligned} \quad \text{Eq. (6)}$$

This allpass filters as defined by Equation 6 allows for the rotation of the phase angle of one output channel relative to the other(s).

The multiple outputs of the allpass filter is not limited to two output channels. In some embodiments, the system 100 generates more than two output channels from the monaural input channel. The allpass filter may be generalized to N channels by defining the rotation and projection operation $O_N(\theta)$ according to Equation 7:

$$O_N(\theta) \equiv [(R_2(\theta_1)P)(R_2(\theta_2)P) \ldots (R_2(\theta_{N-1})P)P] \quad \text{Eq. (7)}$$

where θ is an (N−1)-dimensional vector of rotation angles. This operation may then be substituted into Equation with the resulting N-dimensional output vector containing each decorrelated version of the input. The allpass filter allows the broadband attenuation of the sum to be constrained, unlike for example, using phase-inversion decorrelation where the broadband attenuation of the summation is +∞ dB, therefore essentially unconstrained.

The broadband attenuation of the sum, notated here as $\alpha_b$, may be determined in the case of N=2 with the following:

$$\alpha_b = 20\log_{10}\left(2\cos\left(\frac{\theta}{2}\right)\right) \quad \text{Eq. (8)}$$

As a result of the channels used in the summation differing only by a phase term, the attenuation constraint $a_b$ is exact. To define a target amplitude response that includes a broadband attenuation constant, Equation 9 may be solved for θ:

$$\theta = 2\cos^{-1}\left(\frac{10^{\frac{\alpha_b}{20}}}{2}\right) \quad \text{Eq. (9)}$$

Using Equation 9, the allpass filter Ab(x(t), θ) can be parameterized by the constraint on the broadband attenuation of the sum. In typical presentation contexts, the parameter θ resulting from this equation will maximize the perceptual spatial extent of the output. Since $\alpha_b$ is specified as a minimum permissible summation gain factor, values of θ resulting in larger gain factors may be selected if the perceived width exceeds the requirements for the particular use case.

In the case of N>2, the more general form of Equation 8 is defined by Equation 10:

$$\alpha_b = 10\log_{10}\left(\left[\sum_n^N \cos(\theta_n)\right]^2 + \left[\sum_n^N \sin(\theta_n)\right]^2\right) \quad \text{Eq. (10)}$$

which may be applied as a constraint while selecting values for θ.

The coefficients of $A_b$(x(t), θ) are determined by the quadrature filter network $H_2$ (x (t))$_1$ and $H_2$(x(t))$_2$, and the angle θ, as follows:

$$\beta_{ab} \equiv [\cos(\theta)\beta_{h1} + \sin(\theta)\beta_{h2}, \beta_{h1}] \quad \text{Eq. (11)}$$

where the quadrature filter coefficients $\beta_{h1}$ and $\beta_{h2}$ are dependent on the implementation of the quadrature filter itself.

In some embodiments, a decorrelation filter which constrains the spectral subband region of attenuation in the summation is desirable in cases where some coloration in the summation is acceptable. By relaxing the constraint that the summation must be completely colorless, the spatial extent may be increased further beyond what is possible with filters like $A_b$(x(t), θ). The resulting target amplitude response is relaxed from a constant function to a polynomial whose characteristics may be parameterized using controls analogous to those used in specifying filters for equalization.

In some embodiments, the system 100 uses a time-domain specification for the allpass filter. For example, a first order allpass filter may be defined by Equation 12:

$$y(t) \equiv \beta_f x(t) + x(t-1) + \beta_f y(t-1) \qquad \text{Eq. (12)}$$

where $\beta$ is a coefficient of the filter that ranges from −1 to +1. The filter implementation may be defined by Equation 13:

$$A_f(x(t), \beta_f) \equiv [y(t), x(t)] \qquad \text{Eq. (13)}$$

The transfer function of this filter is expressed as the differential phase shift $\vartheta_\omega$ from one output to the other. This differential phase shift is a function of radian frequency $\omega$ as defined by Equation 14:

$$v_\omega = -\omega + 2\tan^{-1}\left(\frac{\beta_f \sin(\omega)}{1 + \beta_f \cos(\omega)}\right) \qquad \text{Eq. (14)}$$

where the target amplitude response, may be derived by substituting $\vartheta_\omega$ for $\theta$ in Equation 9. The frequency $f_c$ at which the summation gain of $\alpha f = 3$ dB may be used as critical point for tuning as defined by Equations 15 and 16:

$$\omega_c \equiv 2\pi \frac{f_c}{f_s} \qquad \text{Eq. (15)}$$

$$\beta_f = \frac{\tan\left(\frac{\omega_c}{2}\right) - 1}{\tan\left(\frac{\omega_c}{2}\right) + 1} \qquad \text{Eq. (16)}$$

By normalizing the target amplitude response to 0 dB, this critical point corresponds to the parameter $f_c$, which may be a −3 dB point.

In some embodiments, the target amplitude response may define constraints on the broadband and subband attenuation. For all the possible values of the coefficients $\beta_f$ of the filter, this system will always behave like a low-pass filter in the summation. This is because of the x(t−1) term, which is not scaled by $\beta_f$.

By combining $A_f(x(t), \beta)$ with $A_b(x(t), \theta)$, many more flexible constraint functions can be achieved. Formally, the two filters are joined as defined by Equation 17:

$$A_{bf}(x(t), \theta_{bf}, \beta_{bf}, \gamma_f, \gamma_b) \equiv \begin{cases} \left(\begin{cases} \begin{bmatrix} A_f(A_b(x(t), \theta_{bf})_1, \beta_{bf})_1 \\ \mathcal{H}(x(t))_1 \end{bmatrix}^T, & \gamma_f = 0 \\ \begin{bmatrix} A_b(x(t), \theta_{bf})_1 \\ \mathcal{H}(x(t))_1 \end{bmatrix}^T, & \gamma_f = 1 \end{cases}\right), & \gamma_b = 0 \\ \left(\begin{cases} \begin{bmatrix} A_f(\mathcal{H}(x(t))_1, \beta_{bf})_1 \\ \mathcal{H}(x(t))_1 \end{bmatrix}^T, & \gamma_f = 0 \\ \begin{bmatrix} \mathcal{H}(x(t))_1 \\ \mathcal{H}(x(t))_1 \end{bmatrix}^T, & \gamma_f = 1 \end{cases}\right), & \gamma_b = 1 \end{cases} \qquad \text{Eq. (17)}$$

where $\gamma_f$: {0,1} and $\gamma_b$: {0,1} are boolean parameters that bypass the first order allpass filter subsystem $A_f(x(t), \beta)$, and $A_b$ (x(t), θ), respectively. These parameters allow for the union of the two parameter spaces, plus an additional unique subspace of parameters, defined in equation (17) in the case where $\gamma_f = \gamma_b = 1$.

The radian frequency $\omega_c$, defined in equation (15), now becomes the critical point wherein the target amplitude response asymptotically approaches −∞:

$$\beta_{bf} = -\frac{\tan\left(\frac{(\omega_c - \varphi)}{2}\right)}{\left(\tan\left(\frac{(\omega_c - \varphi)}{2}\right)\cos(\omega_c)\right) - \sin(\omega_c)} \qquad \text{Eq. (18)}$$

where $\varphi$ is a term derived from the high-level parameters $0 < \theta_{bf} < \frac{1}{2}$ and $\Gamma$: {0, 1} via Equation (19):

$$\varphi \equiv 2\pi\left(\left(\left(\theta_{bf} + \left(\frac{\Gamma}{2}\right)\right)\% \frac{1}{2}\right) - \frac{1}{2}\right) \qquad \text{Eq. (19)}$$

The parameter $\theta_{bf}$ allows us to control the filter characteristic about the inflection point $f_c$. For $0 < \theta_{bf} < \frac{1}{4}$, the characteristic is low-pass, with a null at $f_c$ and a spectral slope in the target amplitude function that smoothly interpolates from favoring low frequencies to flat, as $\theta_{bf}$ increases. For $\frac{1}{4} < \theta_{bf} < \frac{1}{2}$, the characteristic smoothly interpolates from flat with a null at $f_c$ to high-pass, as $\theta_{bf}$ increases. For $\theta_{bf} = \frac{1}{4}$, the target amplitude function is purely band-reject, with a null at $f_c$.

The parameter Γ is a boolean value which places the target amplitude function determined by $f_c$ and $\theta_{bf}$ into either the sum of the two channels (i.e. L+R) or the difference (i.e. L-R). Due to the allpass constraint on both outputs to the filter network, the action of F is to toggle between complementary target amplitude responses.

Both sets of coefficients $\beta_{bf}$ and $\beta_{ab}$ are used to calculate the final coefficients $\beta_{abf}$ of the total system. This accommodates the composition operation in equation (17). In the coefficient space, the composition of two linear filters is equivalent to the multiplication of two polynomials. With that in mind, the coefficients $\beta_{abf}$, following directly from the definition of the combined system in (17), may be described as follows:

$$\beta_{abf} = \begin{cases} \left(\begin{cases} [\beta_{ab1} \star \beta_{bf}), & \beta_{h_1}], & \gamma_f = 0 \\ [\beta_{ab1}, & \beta_{h1}], & \gamma_f = 1 \end{cases}\right), & \gamma_f = 0 \\ \left(\begin{cases} [\beta_{bf_1}, & \beta_{h_1}], & \gamma_f = 0 \\ [\beta_{h_1}, & \beta_{h_1}], & \gamma_f = 1 \end{cases}\right), & \gamma_b = 1 \end{cases} \qquad \text{Eq. (20)}$$

where the symbol * is used to explicitly denote the multiplication of polynomial coefficients.

In some embodiments, the system 100 uses a frequency-domain specification for the allpass filter. For example, the filter configuration module 104 may use equations in the form of Equation 9 to determine a vectorized transfer function of K phase angles $\theta \equiv \theta_1, \theta_2, \ldots, \theta_K$ from a vectorized target amplitude response of K narrow-band attenuation constraints $\alpha = \alpha_1, \alpha_2, \ldots, \alpha_K$.

The phase angle vector θ generates a Finite Impulse Response filter as defined by Equation 21:

$$B_n\left(\begin{bmatrix}\theta_1\\ \theta_2\\ \vdots\\ \theta_K\end{bmatrix}\right) \equiv DFT^{-1}\left(\begin{bmatrix}\cos(\theta_1)+j\sin(\theta_1)\\ \cos(\theta_2)+j\sin(\theta_2)\\ \vdots\\ \cos(\theta_K)+j\sin(\theta_K)\\ \cos(\theta_{K-1})-j\sin(\theta_{K-1})\\ \vdots\\ \cos(\theta_2)-j\sin(\theta_2)\end{bmatrix}\right) \quad \text{Eq. (21)}$$

where $DFT^{-1}$ denotes the inverse Discrete Fourier Transform and $i\equiv\sqrt{-1}$. The vector of 2(K−1) FIR filter coefficients Bn(θ) may then be applied to x(t) as defined by Equation 22:

$$A_n(x(t),\theta)\equiv[B_n(\theta) \circledast x(t), x(t)] \quad \text{Eq. (22)}$$

where $\circledast$ denotes the convolution operation.

While Equations 21 and 22 provide an effective means for constraining the target amplitude response, its implementation will often rely on relatively high-order FIR filters, resulting from an inverse DFT operation. This may be unsuitable for systems with constrained resources. In such cases, a low-order infinite impulse response (IIR) implementation may be used, such as discussed in connection with Equation 16.

The allpass filter module 106 applies the allpass filter as configured by the filter configuration module 104 to the monaural channel x(t) to generate the output channels $y_a(t)$ and $y_b(t)$. Application of the allpass filter to the channel x(t) may be performed as defined by Equation 6, 11, 15, or 17. The allpass filter module 106 provides each output channel to a respective speaker, such as the channel $y_a(t)$ to the speaker 110*a* and the channel $y_b(t)$ to the speaker 110*b*.

Figure 2:
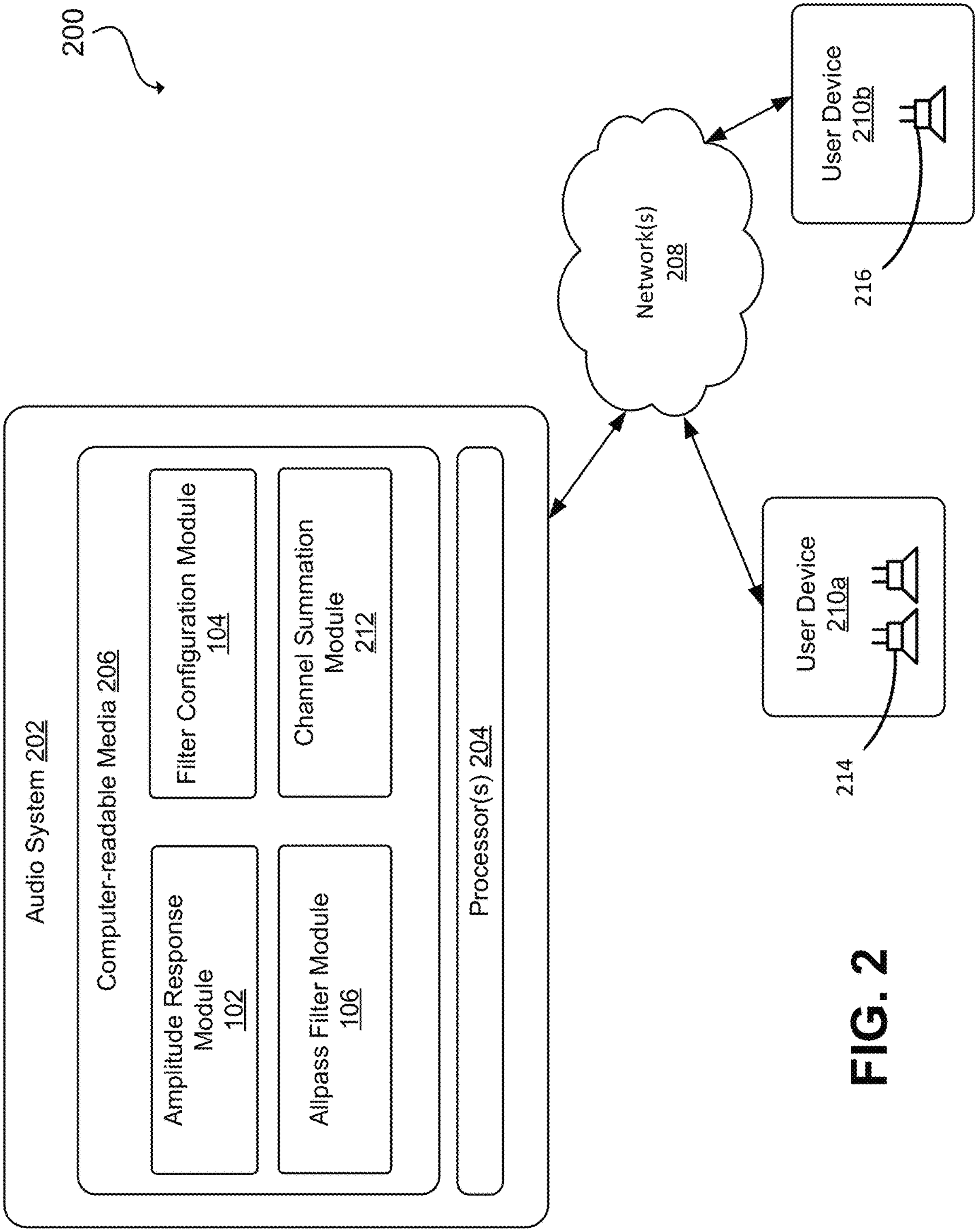
FIG. 2 is a block diagram of a computing system environment, in accordance with some embodiments.

FIG. 2 is a block diagram of a computing system environment 200, in accordance with some embodiments. The computing system 200 may include an audio system 202, which may include one or more computing devices (e.g., servers), connected to user devices 210*a* and 210*b* via a network 208. The audio system 202 provides audio content to the user devices 210*a* and 210*b* (also individually referred to as user device 210) via the network 208. The network 208 facilitates communication between the system 202 and the user devices 210. The network 106 may include various types of networks, including the Internet.

The audio system 202 includes one or more processors 204 and computer-readable media 206. The one or more processors 204 execute program modules that cause the one or more processors 204 to perform functionality, such as generating multiple output channels from a monaural channel. The processor(s) 204 may include one or more of a central processing unit (CPU), a graphics processing unit (GPU), a controller, a state machine, other types of processing circuitry, or one or more of these in combination. A processor 204 may further include a local memory that stores program modules, operating system data, among other things.

The computer-readable media 206 is a non-transitory storage medium that stores program code for the amplitude response module 102, the filter configuration module 104, the allpass filter module 106, and a channel summation module 212. The allpass filter module 106, as configured by the amplitude response module 102 and filter configuration module 104, generates multiple output channels from a monaural channel. The system 202 provides the multiple output channels to the user device 210*a*, which includes multiple speakers 214 to render each of the output channels.

The channel summation module 212 generates a monaural output channel by adding together the multiple output channels generated by the allpass filter module 106. The system 202 provides the monaural output channel to the user device 210*b*, which includes a single speaker 216 to render the monaural output channel. In some embodiments, the channel summation module 212 is located at the user device 210*b*. The audio system 202 provides the multiple output channels to the user device 210*b*, which converts the multiple channels into the monaural output channel for the speaker 216.

A user device 210 presents audio content to the user. The user device 210 may be a computing device of a user, such as a music player, smart speaker, smart phone, wearable device, tablet, laptop, desktop, or the like.

Example Processes

Figure 3:
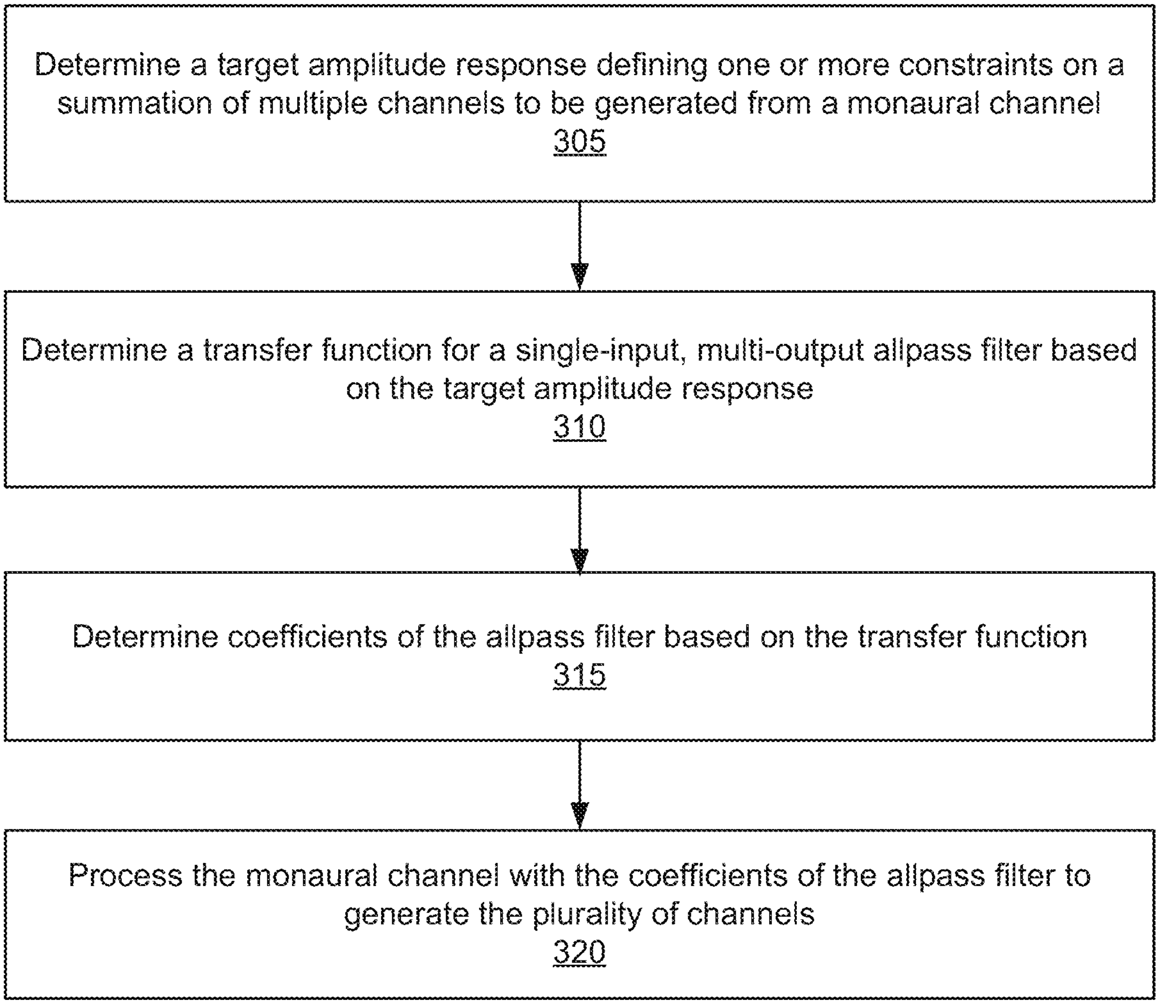
FIG. 3 is a flowchart of a process for generating multiple channels from a monaural channel, in accordance with some embodiments.

FIG. 3 is a flowchart of a process 300 for generating multiple channels from a monaural channel, in accordance with some embodiments. The process shown in FIG. 3 may be performed by components of an audio system (e.g., system 100 or 202). Other entities may perform some or all of the steps in FIG. 3 in other embodiments. Embodiments may include different and/or additional steps, or perform the steps in different orders.

The audio system determines 305 a target amplitude response defining one or more constraints on a summation of multiple channels to be generated from a monaural channel. The one or more constraints on the summation may include a target broadband attenuation, a target subband attenuation, an critical point, or a filter characteristic. The critical point may be an inflection point at 3 dB. The filter characteristic may include one of a high-pass filter characteristic, a low-pass characteristic, a band-pass characteristic, or a band-reject characteristic.

The one or more constraints may be determined based on characteristics of the presentation device (e.g., frequency response of speakers, location of speakers), the expected content of the audio data, the perceptual capacity of the listener in context, or the minimum quality of requirements for mono presentation compatibility. For example, if the speaker is incapable of sufficiently reproducing frequencies below 200 hz, the audio system may effectively hide the attenuated region of the target amplitude response below this frequency. Similarly, if the expected audio content is speech, the audio system may select a target amplitude response which only affects frequencies outside of those needed for intelligibility. If the listener will be deriving audible cues from other sources in context, such as another array of speakers in the location, the audio system may determine a target amplitude response which is complementary to those simultaneous cues.

The audio system determines 310 a transfer function for a single-input, multi-output allpass filter based on the target amplitude response. The transfer function defines relative rotations of phase angles of the output channels. The transfer function describes the effect a filter network has on its input, for each output, in terms of phase angle rotations as a function of frequency.

The audio system determines 315 coefficients of the allpass filter based on the transfer function. These coefficients will be selected and applied to the incoming audio stream in the manner best suited for the type of constraint and the chosen implementation. Some examples of coefficient sets are defined in Equations 11, 16, 18, 20, and 21. In some embodiments, determining the coefficients of the allpass filter based on the transfer function includes using an inverse discrete fourier transform (idft). In this case, the coefficient set may be determined as defined by Equation 21.

In some embodiments, determining the coefficients of the allpass filter based on the transfer function includes using a phase-vocoder. In this case, the coefficient set may be determined as defined by Equation 21, except these would be applied in the frequency domain, prior to resynthesizing time-domain data.

The audio system 320 processes the monaural channel with the coefficients of the allpass filter to generate a plurality of channels. If the system is operating in the time-domain, using an IIR implementation, as in Equations 11, 16, 18, and 20, the coefficients may scale the appropriate feedback and feedforward delays. If an FIR implementation is used, as in Equation 21, then only feedforward delays may be used. If the coefficients are determined and applied in the spectral domain, they may be applied as a complex multiplication to spectral data prior to resynthesis. The audio system may provide the plurality of output channels to presentation device, such as a user device that is connected to the audio system via a network. In some embodiments, such as when the presentation device includes only a single speaker, the audio system combines the plurality of channels into a monaural output channel and provides the monaural output channel to the presentation device.

Figure 4A:
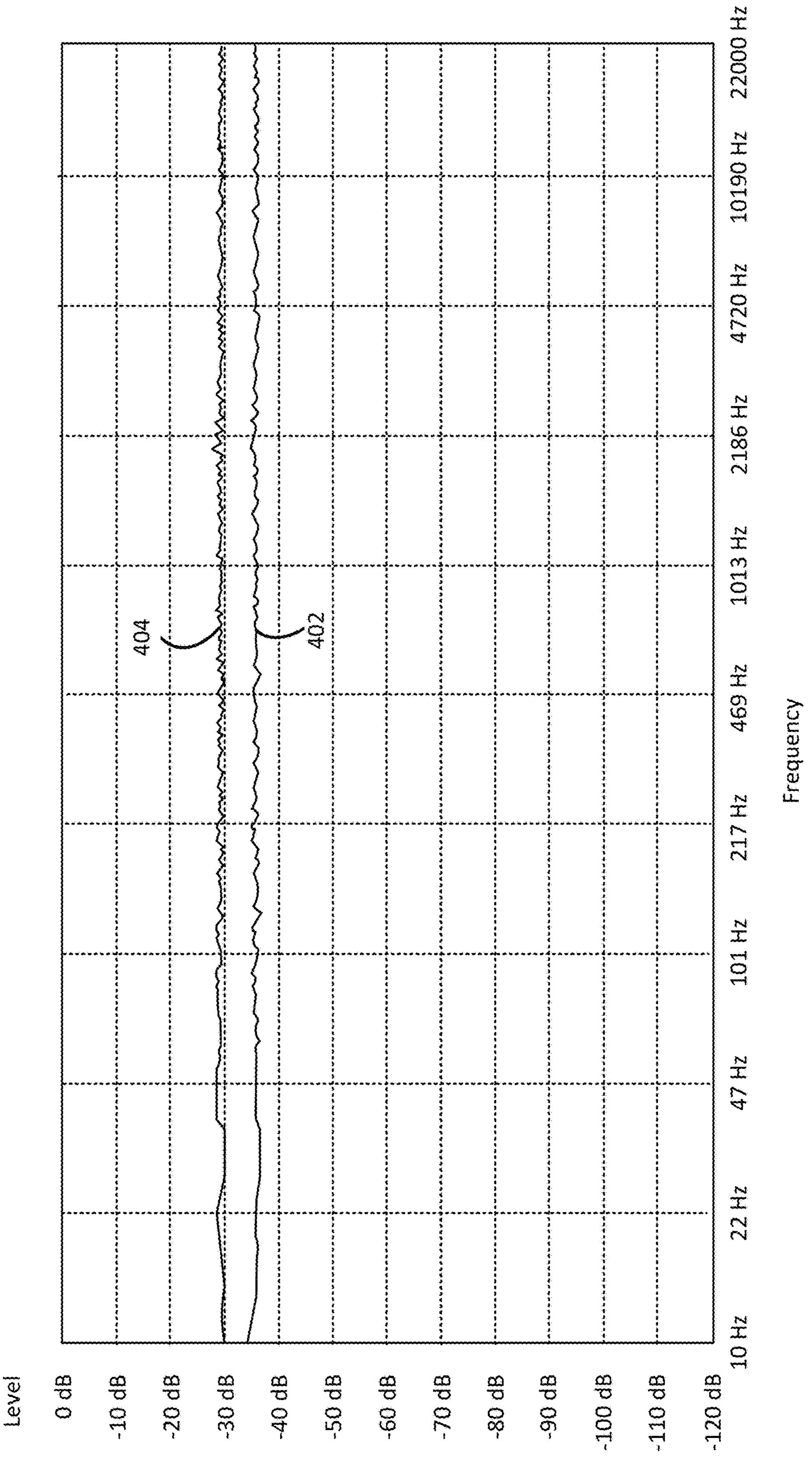
FIG. 4A is an example of a target amplitude response including a target broadband attenuation, in accordance with some embodiments.

FIG. 4A is an example of a target amplitude response including a target broadband attenuation, in accordance with some embodiments. A summation 402 of multiple channels generated from a monaural channel and a difference 404 of the multiple channels are shown. The constraints of the target amplitude response are applied to the summation while the difference may accommodate to retain an allpass characteristic. In this example, the target broadband attenuation across all frequencies is −6 dB.

Figure 4B:
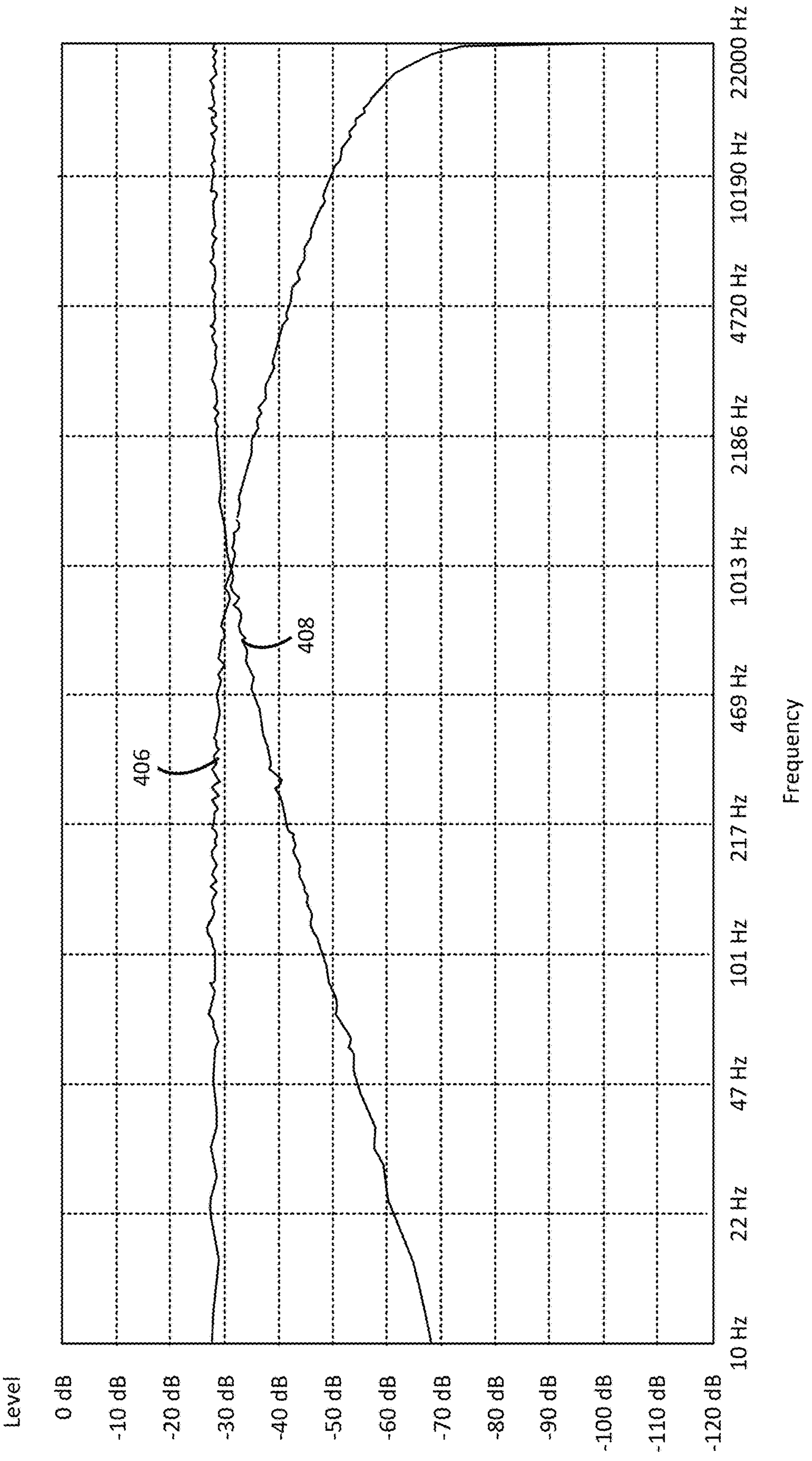
FIG. 4B is an example of a target amplitude response including a critical point, in accordance with some embodiments.

FIG. 4B is an example of a target amplitude response including a critical point, in accordance with some embodiments. A summation 406 of multiple channels generated from a monaural channel and a difference 408 of the multiple channels are shown The critical point includes a −3 dB critical point (e.g., a crossover) at 1 kHz.

Figure 4C:
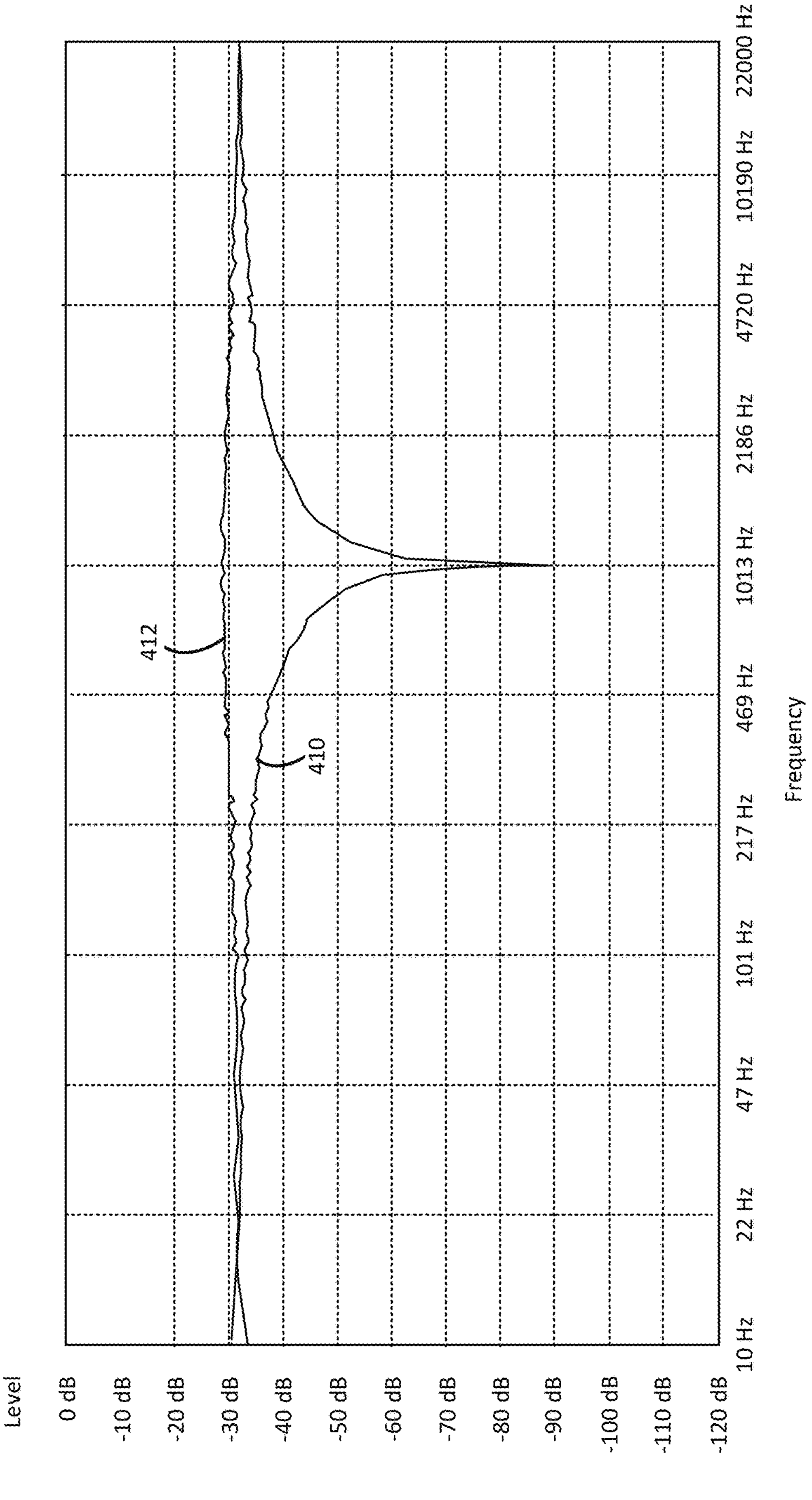
FIG. 4C is an example of a target amplitude response including a critical point, in accordance with some embodiments.
Figure 4D:
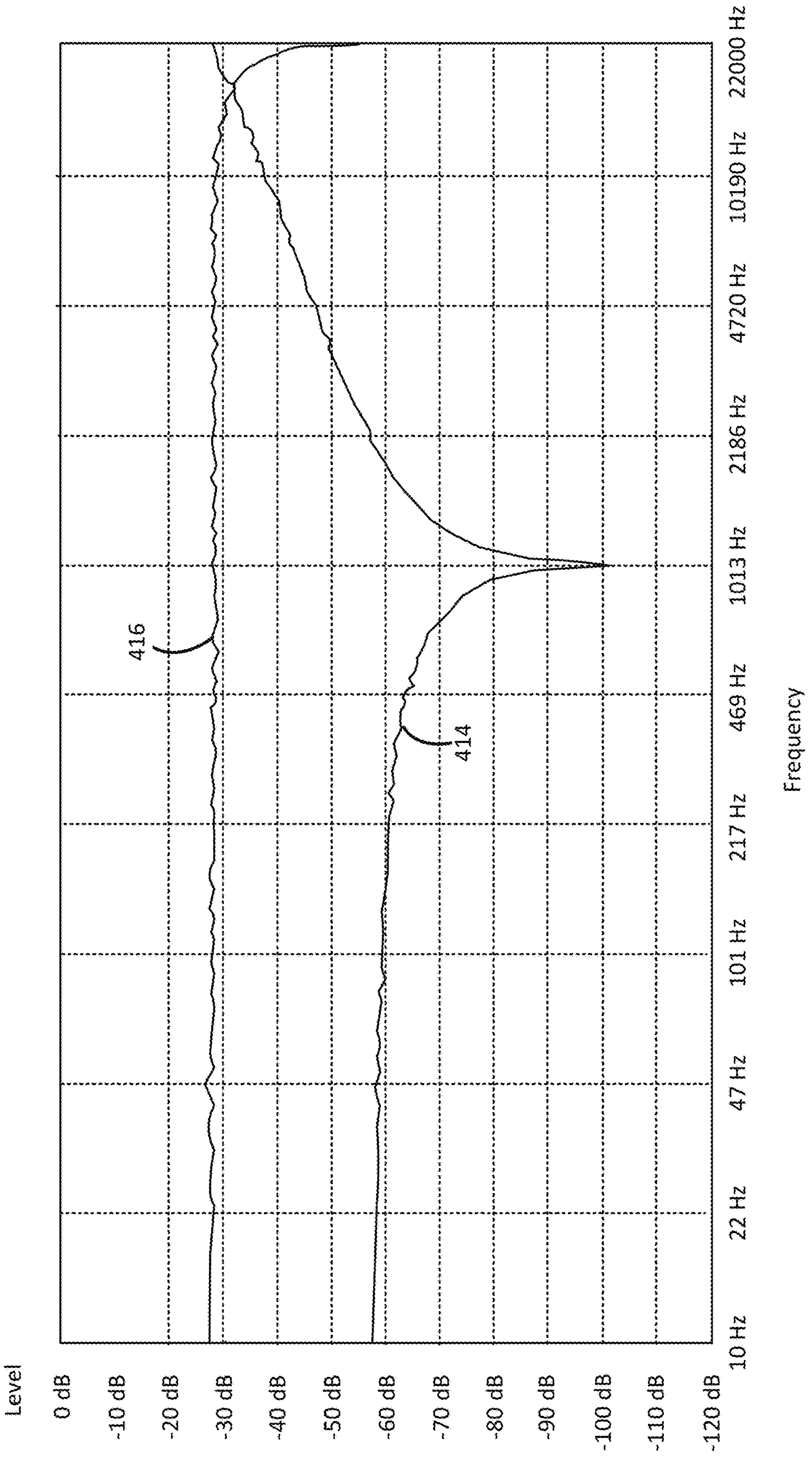
FIG. 4D is an example of a target amplitude response including a critical point and a high-pass filter characteristic, in accordance with some embodiments.

FIG. 4C is an example of a target amplitude response including a critical point, in accordance with some embodiments. A summation 410 of multiple channels generated from a monaural channel and a difference 412 of the multiple channels are shown The critical point includes a −∞ dB critical point (e.g., a null) at 1 kHz FIG. 4D is an example of a target amplitude response including a critical point and a high-pass filter characteristic, in accordance with some embodiments. A summation 414 of multiple channels generated from a monaural channel and a difference 416 of the multiple channels are shown The −∞ dB critical point is at 1 kHz, and there is a high-pass filter characteristic.

Figure 4E:
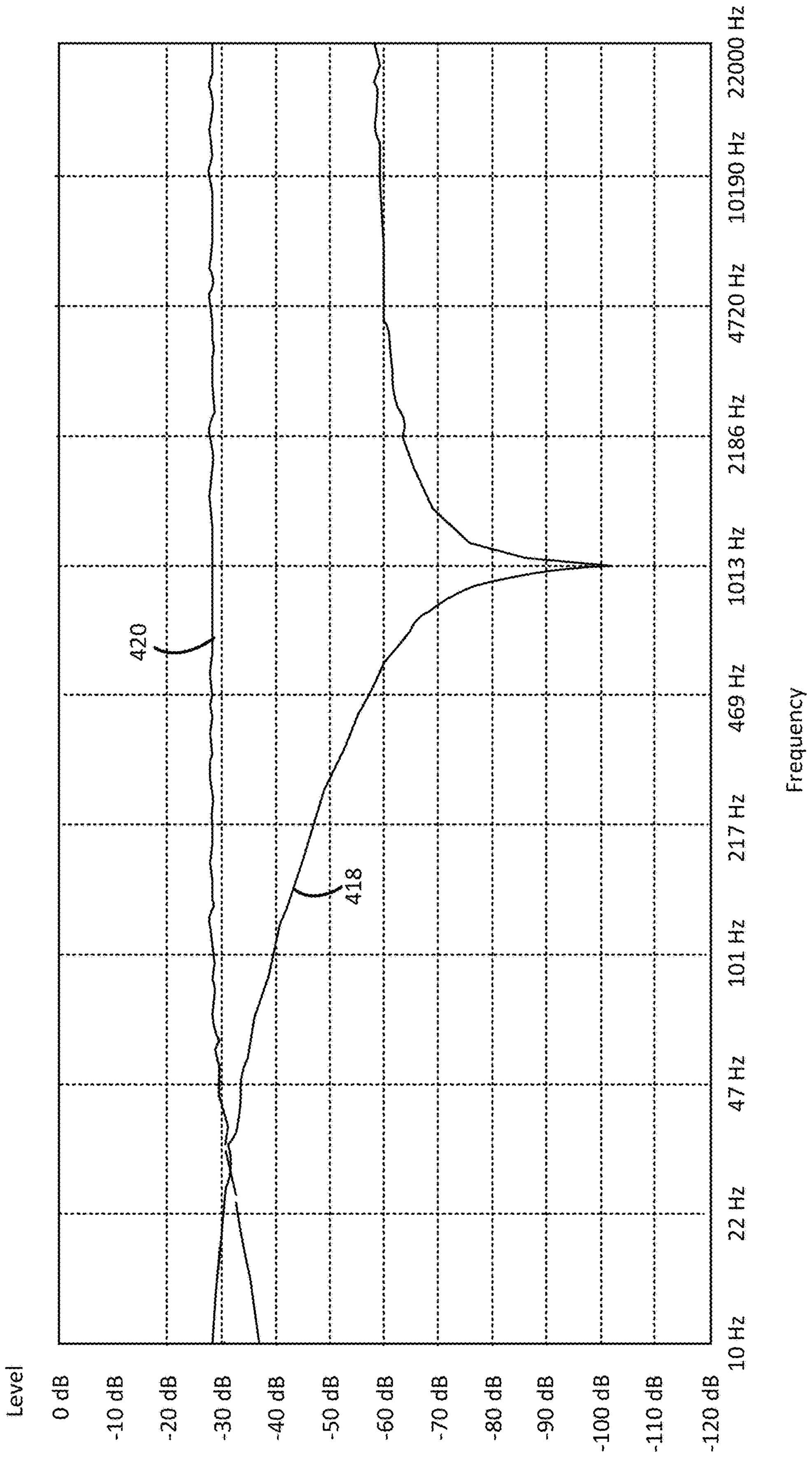
FIG. 4E is an example of a target amplitude response including a critical point and a low-pass filter characteristic, in accordance with some embodiments.

FIG. 4E is an example of a target amplitude response including a critical point and a low-pass filter characteristic, in accordance with some embodiments. A summation 418 of multiple channels generated from a monaural channel and a difference 420 of the multiple channels are shown The −∞ dB critical point is at 1 kHz, and there is a low-pass filter characteristic.

Figure 5:
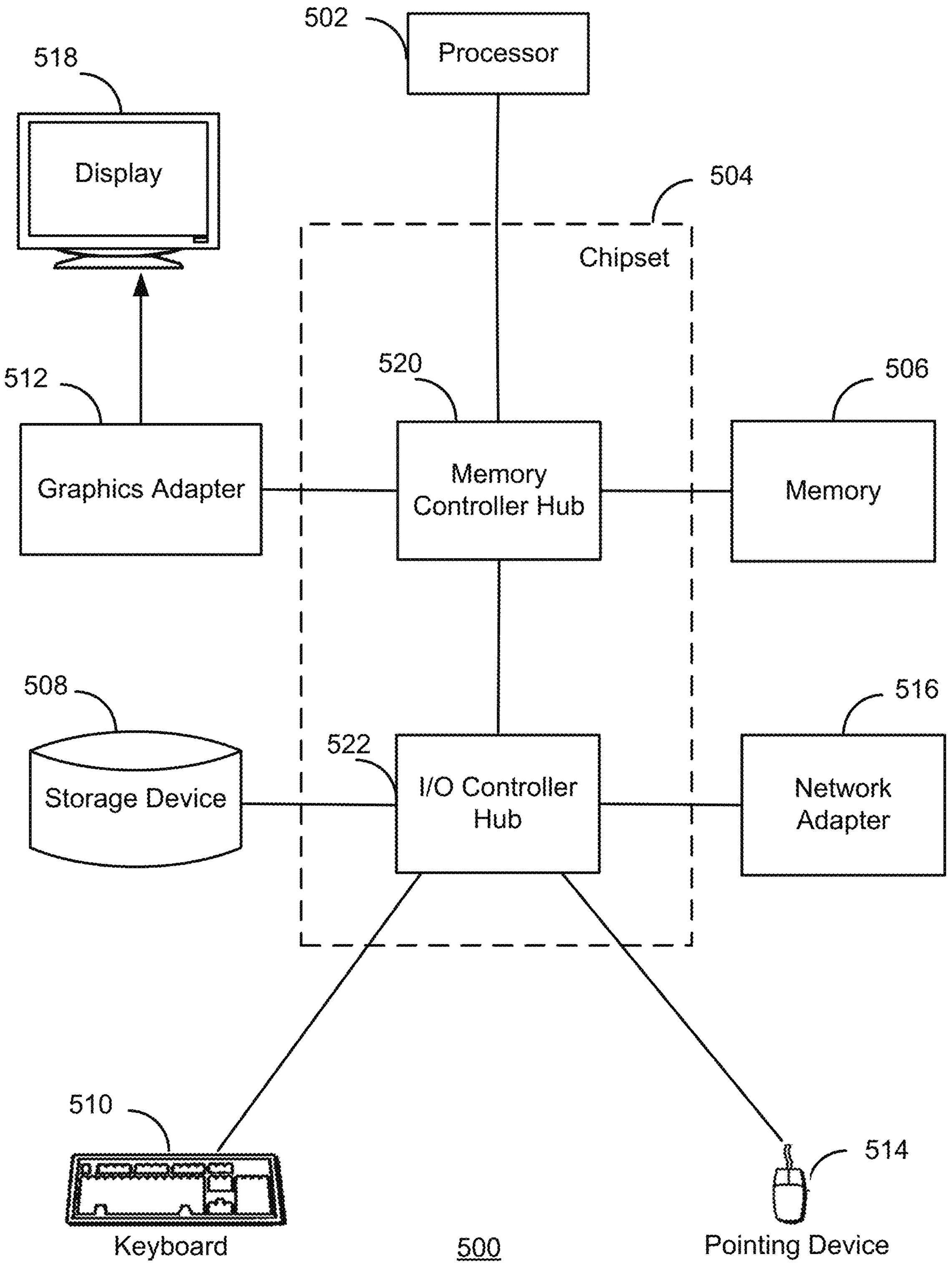
FIG. 5 is a block diagram of a computer, in accordance with some embodiments.

FIG. 5 is a block diagram of a computer 500, in accordance with some embodiments. The computer 500 is an example of computing device including circuitry that implements an audio system, such as the audio system 100 or 202. Illustrated are at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display device 518 is coupled to the graphics adapter 512. A storage device 508, keyboard 510, pointing device 514, and network adapter 516 are coupled to the I/O controller hub 522. The computer 500 may include various types of input or output devices. Other embodiments of the computer 500 have different architectures. For example, the memory 506 is directly coupled to the processor 502 in some embodiments.

The storage device 508 includes one or more non-transitory computer-readable storage media such as a hard drive, compact disk read-only memory (CD-ROM), DVD, or a solid-state memory device. The memory 506 holds program code (comprised of one or more instructions) and data used by the processor 502. The program code may correspond to the processing aspects described with reference to FIGS. 1 through 3.

The pointing device 514 is used in combination with the keyboard 510 to input data into the computer system 500. The graphics adapter 512 displays images and other information on the display device 518. In some embodiments, the display device 518 includes a touch screen capability for receiving user input and selections. The network adapter 516 couples the computer system 500 to a network. Some embodiments of the computer 500 have different and/or other components than those shown in FIG. 5.

Circuitry may include one or more processors that execute program code stored in a non-transitory computer readable medium, the program code when executed by the one or more processors configures the one or more processors to implement an audio system or modules of the audio system. Other examples of circuitry that implements an audio system or modules of the audio system may include an integrated circuit, such as an application-specific integrated circuit (ASIC), field-programmable gate array (FPGA), or other types of computer circuits.

Additional Considerations

Example benefits and advantages of the disclosed configurations include dynamic audio enhancement due to the enhanced audio system adapting to a device and associated audio rendering system as well as other relevant information made available by the device OS, such as use-case information (e.g., indicating that the audio signal is used for music playback rather than for gaming). The enhanced audio system may either be integrated into a device (e.g., using a software development kit) or stored on a remote server to be accessible on-demand. In this way, a device need not devote storage or processing resources to maintenance of an audio enhancement system that is specific to its audio rendering system or audio rendering configuration. In some embodiments, the enhanced audio system enables varying levels of querying for rendering system information such that effective audio enhancement can be applied across varying levels of available device-specific rendering information.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Upon reading this disclosure, those of skill in the art will appreciate still additional alternative structural and functional designs for a system and a process for audio content decorrelation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system for generating a plurality of channels from a monaural channel, comprising:

one or more computing devices configured to:

set one or more coefficients of a single-input, multi-output allpass filter, wherein the one or more coefficients are determined based on a single-input, multi-output transfer function; and process the monaural channel using the allpass filter to generate the plurality of channels, the allpass filter configured based upon the one or more coefficients.

2. The system of claim 1, wherein the transfer function is determined based upon a target amplitude response, the target amplitude response being defined by relationships between amplitude values and frequency values.

3. The system of claim 2, wherein the target amplitude response is determined by defining one or more constraints on a summation of the plurality of channels, the target amplitude response being defined by relationships between amplitude values of the summation and frequency values of the summation.

4. The system of claim 3, wherein the one or more constraints include a target broadband attenuation for the summation of the plurality of channels.

5. The system of claim 3, wherein the one or more constraints include a target subband attenuation for the summation of the plurality of channels.

6. The system of claim 3, wherein the one or more constraints include a critical point defining on curvature of the target amplitude response.

7. The system of claim 6, wherein the critical point defines a frequency at which the target amplitude response −3 dB.

8. The system of claim 6, wherein the critical point defines a frequency at which the target amplitude response is −∞ dB.

9. The system of claim 3, wherein the one or more constraints include a filter characteristic in the summation of the plurality of channels.

10. The system of claim 9, wherein the filter characteristic includes one of:

a high-pass filter characteristic;

a low-pass filter characteristic;

a band-pass filter characteristic; or a band-reject filter characteristic.

11. The system of claim 3, wherein the one or more constraints include a critical point and a filter characteristic.

12. The system of claim 3, wherein the one or more constraints include a target broadband attenuation, a critical point, and a filter characteristic.

13. The system of claim 1, wherein the one or more computing devices configured to determine the one or more coefficients of the allpass filter based on the transfer function includes the one or more computing devices being configured to use an inverse discrete fourier transform (idft).

14. The system of claim 1, wherein the one or more computing devices configured to determine the one or more coefficients of the allpass filter based on the transfer function includes the one or more computing devices being configured to use a phase-vocoder.

15. The system of claim 1, wherein the transfer function defines a rotation of a first phase angle of a first channel of the plurality of channels relative to a second phase angle of a second channel of the plurality of channels.

16. The system of claim 1, wherein the one or more computing devices are further configured to combine the plurality of channels into a monaural output channel.

17. The system of claim 1, wherein the one or more computing devices are further configured to provide the plurality of channels to a user device via a network.

18. A method for generating a plurality of channels from a monaural channel, comprising, by a circuitry:

setting one or more coefficients of a single-input, multi-output allpass filter, wherein the one or more coefficients are determined based on a single-input, multi-output transfer function; and processing the monaural channel using the allpass filter to generate the plurality of channels, the allpass filter configured based upon the one or more coefficients.

19. The method of claim 18, wherein the transfer function is determined based upon a target amplitude response, the target amplitude response being defined by relationships between amplitude values and frequency values.

20. The method of claim 19, wherein the target amplitude response is determined by defining one or more constraints on a summation of the plurality of channels, the target amplitude response being defined by relationships between amplitude values of the summation and frequency values of the summation.

21. The method of claim 20, wherein the one or more constraints include a target broadband attenuation for the summation of the plurality of channels.

22. The method of claim 20, wherein the one or more constraints include a target subband attenuation for the summation of the plurality of channels.

23. The method of claim 20, wherein the one or more constraints include a critical point defining on curvature of the target amplitude response.

24. The method of claim 23, wherein the critical point defines a frequency at which the target amplitude response −3 dB.

25. The method of claim 23, wherein the critical point defines a frequency at which the target amplitude response is −∞ dB.

26. The method of claim 20, wherein the one or more constraints include a filter characteristic in the summation of the plurality of channels.

27. The method of claim 26, wherein the filter characteristic includes one of:

a high-pass filter characteristic;

a low-pass filter characteristic;

a band-pass filter characteristic; or a band-reject filter characteristic.

28. The method of claim 20, wherein the one or more constraints include a critical point and a filter characteristic.

29. The method of claim 20, wherein the one or more constraints include a target broadband attenuation, a critical point, and a filter characteristic.

30. The method of claim 18, wherein determining the one or more coefficients of the allpass filter based on the transfer function includes using an inverse discrete fourier transform (idft).

31. The method of claim 18, wherein determining the one or more coefficients of the allpass filter based on the transfer function includes using a phase-vocoder.

32. The method of claim 18, wherein the transfer function defines a rotation of a first phase angle of a first channel of the plurality of channels relative to a second phase angle of a second channel of the plurality of channels.

33. The method of claim 18, further comprising, by the processing circuitry, combining the plurality of channels into a monaural output channel.

34. The method of claim 18, further comprising, by the processing circuitry, providing the plurality of channels to a user device via a network.

35. A non-transitory computer readable medium comprising stored instructions for generating a plurality of channels from a monaural channel, the instructions that, when executed by at least one processor, configure the at least one processor to:

set one or more coefficients of a single-input, multi-output allpass filter, wherein the one or more coefficients are determined based on a single-input, multi-output transfer function; and process the monaural channel using the allpass filter to generate the plurality of channels, the allpass filter configured based upon the one or more coefficients.

36. The non-transitory computer readable medium of claim 35, wherein the transfer function is determined based upon a target amplitude response, the target amplitude response being defined by relationships between amplitude values and frequency values.

37. The non-transitory computer readable medium of claim 36, wherein the target amplitude response is determined by defining one or more constraints on a summation of the plurality of channels, the target amplitude response being defined by relationships between amplitude values of the summation and frequency values of the summation.

38. The non-transitory computer readable medium of claim 37, wherein the one or more constraints include a target broadband attenuation for the summation of the plurality of channels.

39. The non-transitory computer readable medium of claim 37, wherein the one or more constraints include a target subband attenuation for the summation of the plurality of channels.

40. The non-transitory computer readable medium of claim 37, wherein the one or more constraints include a critical point defining on curvature of the target amplitude response.

41. The non-transitory computer readable medium of claim 40, wherein the critical point defines a frequency at which the target amplitude response −3 dB.

42. The non-transitory computer readable medium of claim 40, wherein the critical point defines a frequency at which the target amplitude response is −∞ dB.

43. The non-transitory computer readable medium of claim 37, wherein the one or more constraints include a filter characteristic in the summation of the plurality of channels.

44. The non-transitory computer readable medium of claim 43, wherein the filter characteristic includes one of:

a high-pass filter characteristic;

a low-pass filter characteristic;

a band-pass filter characteristic; or a band-reject filter characteristic.

45. The non-transitory computer readable medium of claim 37, wherein the one or more constraints include a critical point and a filter characteristic.

46. The non-transitory computer readable medium of claim 37, wherein the one or more constraints include a target broadband attenuation, a critical point, and a filter characteristic.

47. The non-transitory computer readable medium of claim 35, wherein the instructions that configure the at least one processor to determine the one or more coefficients of the allpass filter based on the transfer function configures the at least one processor to use an inverse discrete fourier transform (idft).

48. The non-transitory computer readable medium of claim 35, wherein the instructions that configure the at least one processor to determine the one or more coefficients of the allpass filter based on the transfer function configures the at least one processor to use a phase-vocoder.

49. The non-transitory computer readable medium of claim 35, wherein the transfer function defines a rotation of a first phase angle of a first channel of the plurality of channels relative to a second phase angle of a second channel of the plurality of channels.

50. The non-transitory computer readable medium of claim 35, wherein the instructions further configure the at least one processor to combine the plurality of channels into a monaural output channel.

51. The non-transitory computer readable medium of claim 35, wherein the instructions further configure the at least one processor to provide the plurality of channels to a user device via a network.

* * * * *